(12) United States Patent
Papp et al.

(10) Patent No.: US 8,552,136 B2
(45) Date of Patent: Oct. 8, 2013

(54) THERMOPLASTIC SILICONE-BASED POLYMER PROCESS ADDITIVES FOR INJECTION MOLDING APPLICATIONS

(75) Inventors: Siegmund Papp, Woodbury, MN (US); Claude Lavallee, Maplewood, MN (US); Audrey A. Sherman, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 206 days.

(21) Appl. No.: 13/131,335

(22) PCT Filed: Nov. 20, 2009

(86) PCT No.: PCT/US2009/065340
§ 371 (c)(1),
(2), (4) Date: May 26, 2011

(87) PCT Pub. No.: WO2010/077480
PCT Pub. Date: Jul. 8, 2010

(65) Prior Publication Data
US 2011/0244159 A1    Oct. 6, 2011

Related U.S. Application Data

(60) Provisional application No. 61/138,238, filed on Dec. 17, 2008.

(51) Int. Cl.
*C08G 77/26* (2006.01)
(52) U.S. Cl.
USPC .............................................. 528/38; 528/26
(58) Field of Classification Search
USPC .................................................. 528/38, 26
See application file for complete search history.

(56) References Cited

U.S. PATENT DOCUMENTS

| | | |
|---|---|---|
| 3,890,269 A | 6/1975 | Martin |
| 4,032,502 A | 6/1977 | Lee et al. |
| 4,107,258 A | 8/1978 | Angell, Jr. et al. |
| 4,535,113 A | 8/1985 | Foster et al. |
| 4,661,577 A | 4/1987 | Jo Lane et al. |
| 4,740,341 A | 4/1988 | Chu |
| 4,857,593 A | 8/1989 | Leung et al. |
| 5,026,890 A | 6/1991 | Webb et al. |
| 5,100,960 A | 3/1992 | Grigo et al. |
| 5,214,119 A | 5/1993 | Leihr et al. |
| 5,225,511 A | 7/1993 | Durfee |
| 5,227,448 A | 7/1993 | Durfee |
| 5,276,122 A | 1/1994 | Aoki et al. |
| 5,356,585 A | 10/1994 | Romenesko |
| 5,403,891 A | 4/1995 | Romenesko |
| 5,461,134 A | 10/1995 | Leir et al. |
| 5,512,650 A | 4/1996 | Leir et al. |
| 5,549,948 A | 8/1996 | Blong et al. |
| 5,708,085 A | 1/1998 | Hauenstein et al. |
| 5,789,473 A | 8/1998 | Hauenstein et al. |
| 5,986,003 A | 11/1999 | Lee et al. |
| 6,013,217 A | 1/2000 | Hauenstein et al. |
| 6,355,759 B1 | 3/2002 | Sherman et al. |
| 6,531,620 B2 | 3/2003 | Brader et al. |
| 6,806,313 B2 | 10/2004 | Couturier |
| 6,939,905 B2 | 9/2005 | Seidel et al. |
| 7,105,233 B2 | 9/2006 | Bechthold et al. |
| 2007/0148474 A1 | 6/2007 | Leir et al. |
| 2007/0149745 A1 | 6/2007 | Leir et al. |
| 2007/0177272 A1 | 8/2007 | Benson et al. |
| 2007/0177273 A1 | 8/2007 | Benson et al. |
| 2007/0185257 A1* | 8/2007 | Wursche et al. ............... 524/539 |
| 2007/0232772 A1 | 10/2007 | Ziche et al. |
| 2007/0297736 A1 | 12/2007 | Sherman et al. |
| 2008/0199620 A1 | 8/2008 | Sherman et al. |
| 2008/0318058 A1* | 12/2008 | Sherman et al. ............ 428/423.1 |
| 2013/0016341 A1* | 1/2013 | Liu et al. ......................... 356/128 |

FOREIGN PATENT DOCUMENTS

| | | |
|---|---|---|
| DE | 4122556 | 1/1993 |
| EP | 0 469 778 | 2/1992 |
| EP | 1 211 277 | 11/2001 |
| EP | 1 862 501 | 12/2007 |
| GB | 1 460 128 | 12/1976 |
| JP | 7145277 | 6/1995 |
| JP | 2001191364 | 7/2001 |
| JP | 2003041231 | 2/2003 |
| WO | WO 2006/069639 | 7/2006 |

OTHER PUBLICATIONS cas.ChemNet.com (http://www.chemnet.com/dict/dict--24980-41-4--en.html) date unknown.*
Van Krevelen (Properties of Polymers, 2nd Ed., Elsevier Scientific Publishing Co., 1976, 212-220).*
ASTM Test Method D1003-95, "Standard Test Method for Haze and Luminous Transmittance of Transparent Plastics,", pp. 197-201 (1995).
ASTM Test Method D790-07, "Standard Test Methods for Flexural Properties of Unreinforced and Reinforced Plastics and Electrical Insulating Materials,", pp. 1-11 (2007).
ASTM Test Method D3641, "Standard Practice for Injection Molding Test Specimens of Thermoplastic Molding and Extrusion Materials", pp. 1-9,(2010).

* cited by examiner

*Primary Examiner* — Kuo-Liang Peng
(74) *Attorney, Agent, or Firm* — C. Michael Geise

(57) ABSTRACT

There is provided a thermoplastic silicone-based polymer process additive component for use in injection molding applications, articles made using the silicone-based polymer process additive component, and methods for making these articles.

13 Claims, No Drawings

THERMOPLASTIC SILICONE-BASED POLYMER PROCESS ADDITIVES FOR INJECTION MOLDING APPLICATIONS

CROSS REFERENCE TO RELATED APPLICATIONS

This application is a national stage filing under 35 U.S.C. 371 of PCT/US2009/065340, filed Nov. 20, 2009, which claims priority to U.S. Provisional Application No. 61/138,238, filed Dec. 17, 2008, the disclosures of which are incorporated by reference in their entirety herein.

TECHNICAL FIELD

The present disclosure relates to thermoplastic silicone-based polymer process additives (PPA) that can be used in injection molding applications. The present disclosure also relates to injection molded articles made using these thermoplastic silicone-based PPA's and methods for making these articles.

BACKGROUND

Injection molding is frequently used to make articles for various applications. Because injection molding involves filling a mold with a melted polymer, articles made using injection molding typically suffer some shrinkage when compared to the dimensions of the mold from which they are made. Inadequate mold filling can also result in article surface defects. Shrinkage and surface defects are due, in part, to thermal contraction of the polymer after it has been injected in the mold and allowed to cool. In order to minimize shrinkage and surface defects, it is known to apply higher injection pressures on the polymer stream feeding the mold. This increases cycle times and processing costs.

It is also common to use lower weight molecular polymers to minimize shrinkage and surface defects while using lower injection pressures and/or lower processing temperatures. These lower molecular weight resins include high density polyethylene (HDPE) having a melt flow index (MFI) ranging from 15 to 40, and higher.

Polydiorganosiloxane PPA's are known as potential process additives that can be used in thermoplastics for injection molding applications. These polydiorganosiloxane PPA's are typically fluidic with very low glass transition (Tg) values at room temperature, and flow at room temperature and above without the need for elevated temperatures. Because of their fluidity at ambient conditions, these polydiorganosiloxane PPA's are difficult to handle in injection molding processes. For example, these polydiorganosiloxane PPA's can not be maintained in pellet form at ambient conditions. This makes it difficult to precisely blend these polydiorganosiloxane PPA's with thermoplastics for injection molding applications.

There exists a need for using higher molecular weight polymers in injection molding applications in order to obtain improvements in physical properties, such as flexural strength, elastic modulus, and the like. There also exists a need for using higher molecular weight polymers in injection molding applications while minimizing injection pressures, part shrinkage and the occurrence of surface defects, and reducing cycle times. There also exists a need for a PPA that is easy to handle at ambient conditions and can be used in pellet form for injection molding applications.

SUMMARY

In one aspect, the present disclosure provides an injected molded article comprising a thermoplastic component and a thermoplastic silicone-based polymer process additive component. In one aspect, the thermoplastic silicone-based polymer process additive component is selected from:

(a) at least one copolymer comprising at least two repeat units of Formula I-a:

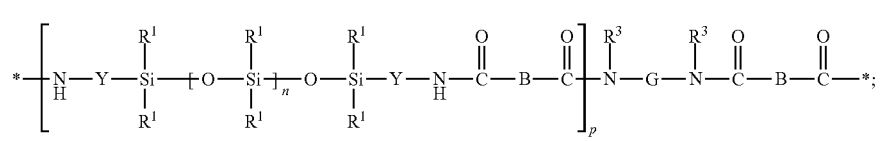

(b) at least two repeat units of Formula I-b:

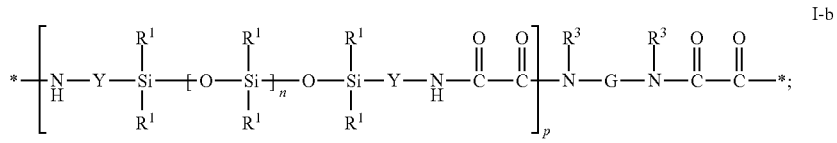

(c) at least two repeat units of Formula II:

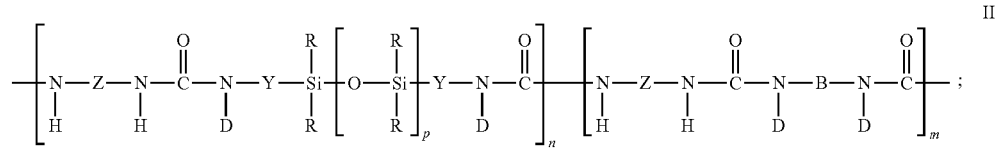

(d) and combinations thereof, where for Formulas I-a and I-b each R1 is independently an alkyl, haloalkyl, aralkyl, alkenyl, aryl, or aryl substituted with an alkyl, alkoxy, or halo; each Y is independently an alkylene, aralkylene, or a combination thereof; G is a divalent residue; each group B is selected from a covalent bond, an alkylene of 4-20 carbons, an aralkylene, an arylene, or a combination thereof; n is an integer of 0 to 1500; and p is an integer of 1 to 10, and where for Formula II each R is an alkyl moiety having about 1 to 12 carbon atoms; each Y is a polyvalent radical; each D is selected from hydrogen, an alkyl radical of 1 to 10 carbon atoms, phenyl, and a radical that completes a ring structure including B or Y to form a heterocyclic; B is a polyvalent radical selected from alkylene, aralkylene, cycloalkylene, phenylene, polyalkylene oxide, and mixtures thereof; m is an integer from 0 to 1000; n is greater than or equal to 1; and p is greater than or equal to 5.

In another aspect, the present disclosure provides a method of making the injection molded article comprising melt mixing the thermoplastic component and the silicone-based polymer process additive component to form a mixture; and injection molding the mixture.

Definitions

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "a", "an", and "the" are used interchangeably with "at least one" to mean one or more of the elements being described.

As used herein, the term "or" is generally employed in its sense including "and/or" unless the content clearly dictates otherwise.

The term "and/or" means one or all of the listed elements or a combination of any two or more of the listed elements.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aryloxy" refers to a monovalent group of formula —OAr where Ar is an aryl group.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term "oxalyl" refers to a divalent group of formula —(CO)—(CO)— where each (CO) denotes a carbonyl group.

The terms "oxalylamino" and "aminoxalyl" are used interchangeably to refer to a divalent group of formula —(CO)—(CO)—NH— where each (CO) denotes a carbonyl.

The term "aminoxalylamino" refers to a divalent group of formula —NH—(CO)—(CO)—$NR^d$— where each (CO) denotes a carbonyl group and $R^d$ is hydrogen, alkyl, or part of a heterocyclic group along with the nitrogen to which they are both attached. In most embodiments, $R^d$ is hydrogen or alkyl. In many embodiments, $R^d$ is hydrogen.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "polydiorganosiloxane" refers to a divalent segment of formula

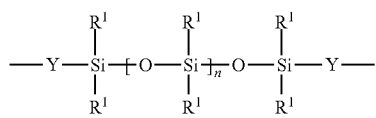

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

The terms "room temperature" and "ambient temperature" are used interchangeably to mean temperatures in the range of 20° C. to 25° C.

The term "substantially free of" as used herein means less than 1 wt % of the total weight of the component or mixture being described, such as less than 1 wt % of the the total weight of the thermoplastic silicone-based PPA component used in a given mixture.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

DETAILED DESCRIPTION

Mixtures containing a thermoplastic silicone-based polymer process additives (PPA) component and a thermoplastic component, methods of making the mixtures, compositions including the mixtures, articles made using the compositions, and methods of making the articles are provided. The thermoplastic silicone-based PPA components are mixed with a variety of thermoplastic components. The mixtures can be hot melt processable mixtures in that both the thermoplastic silicone-based PPA components and the thermoplastic components can be hot melt processed, i.e., can be processed by heating to a flowable melt state.

In some embodiments, the thermoplastic silicone-based PPA component comprises polydiorganosiloxane polyamide copolymers. Some of these polydiorganosiloxane polyamide copolymers are of an $(AB)_n$ type, which are the condensation reaction product of (a) a diamine having primary or secondary amino groups with (b) a precursor having at least one polydiorganosiloxane segment and at least two dicarboxamido ester groups (preferably oxalylamido ester groups). The copolymers have many of the desirable features of polysiloxanes such as low glass transition temperatures, thermal and oxidative stability, resistance to ultraviolet radiation, low surface energy and hydrophobicity, and high permeability to many gases. Additionally, the copolymers can have improved mechanical strength and elastomeric properties compared to polysiloxanes. At least some of the copolymers are optically clear, have a low refractive index, or both. Accordingly, at least some of the polymeric mixtures have similar properties.

The relative amounts of these components in a given mixture or composition containing the mixture depend upon the particular rheological and mechanical properties sought, as well as the individual components themselves (e.g. the molecular weight of the thermoplastic component, the degree of polymerization of the thermoplastic silicone-based PPA component). In general, however preferred compositions contain at least 0.1 percent by weight (wt-%) of the thermoplastic silicone-based PPA component, and no more than 99.9 wt-% of the thermoplastic component. In some embodiments, the mixture comprises 5 wt-% of the thermoplastic silicone-based PPA component and 95 wt-% of the thermoplastic component. In some embodiments, the mixture comprises 3 wt-% of the thermoplastic silicone-based PPA component and 97 wt-% of the thermoplastic component. In some embodiments, the mixture comprises 1 wt-% of the thermoplastic silicone-based PPA component and 99 wt-% of the thermoplastic component.

Thermoplastic Component

Thermoplastics are generally materials that flow when heated sufficiently above their glass transition point and become solid when cooled. They may also have elastomeric properties. The thermoplastic component includes but is not limited to hot melt processable thermoplastic polymers (which may be elastomeric or nonelastomeric), such as polypropylene, polystyrene, polyethylene, polyesters and fluoroplastics, or mixtures thereof, excluding thermoplastic silicone-based PPA's as described herein (e.g., those of Formulas I-a, I-b, and II). By "hot melt processable" it is meant that the polymer will melt and flow at a temperature at which the thermoplastic silicone-based PPA's of Formulas I-a, I-b, and II) will melt and flow.

The thermoplastic component may be solvent or melt mixed with the thermoplastic silicone-based PPA component(s). The thermoplastic component may comprise other additives, fillers, and the like, however it is not a thermoplastic silicone-based PPA compound of Formulas I-a, I-b, and II.

At use temperature the mixtures generally have at least two domains, one discontinuous and the other continuous, because of the general immiscibility of the thermoplastic silicone-based PPA component with the thermoplastic component. Of course, the mixture may contain more than one thermoplastic silicone-based PPA component and more than one thermoplastic component.

Thermoplastic materials useful in the present disclosure that are generally considered nonelastomeric include, for example, polyolefins such as polypropylene, low density polyethylene, linear low density polyethylene, very low density polyethylene, medium density polyethylene, high density polyethylene, such as that available under the trade designation DOW HDPE DMDA-8904 NT7 commercially available from DOW Plastics an affiliate of the DOW Chemical Co., Michigan USA, polybutylene, nonelastomeric polyolefin copolymers or terpolymers, such as ethylene/propylene copolymer and blends thereof; ethylene-vinyl acetate copolymers such as that available under the trade designation ELVAX 260, available from DuPont Chemical Co.; ethylene acrylic acid copolymers; ethylene methacrylic acid copolymers such as that available under the trade designation SURLYN 1702, available from DuPont Chemical Co.; polymethylmethacrylate; polystyrene; ethylene vinyl alcohol; polyester; amorphous polyester; polyamides; fluorinated thermoplastics, such a polyvinylidene fluoride, fluorinated ethylene/propylene copolymers and fluorinated ethylene/propylene copolymers; halogenated thermoplastics, such as a chlorinated polyethylene and polyvinyl chloride (PVC). Any single thermoplastic material can be mixed with at least one thermoplastic silicone-based PPA-containing component. Alternatively, a mixture of thermoplastic materials may be used.

Thermoplastic Silicone-based Polymer Process Additive Component

Various thermoplastic silicone-based PPA's are useful in mixtures presently disclosed. Thermoplastic silicone-based polymer process additive component useful in the present disclosure typically have a molecular weight greater than 50,000 g/mol, and even greater than 100,000 g/mol. These thermoplastic silicone-based PPA's include linear, polydiorganosiloxane polyamide block copolymers, polydiorganosiloxane urea-containing copolymers, and the like. Thermoplastic silicone-based PPA's presently disclosed are substantially free of fluoropolymers, siloxanes and any other process additives that are not "hot melt processable" per se in that hey are typically fluidic polymers with very low glass transition (Tg) values at room temperature, and flow at room temperature and above without the need for elevated temperatures.

A linear, polydiorganosiloxane polyamide block copolymer useful in mixtures of the present disclosure contains at least two repeat units of Formula I-a:

In this Formula I-b, each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and the subscript p is an integer of 1 to 10. Group G is a divalent group that is the residue unit that is equal to a diamine of formula $R^3HN$-G-$NHR^3$ minus the two —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each asterisk (*) indicates a site of attachment of the repeat unit to another group in the copolymer such as, for example, another repeat unit of Formula I-b.

Suitable alkyl groups for $R^1$ in Formula I (I-a or I-b) typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon

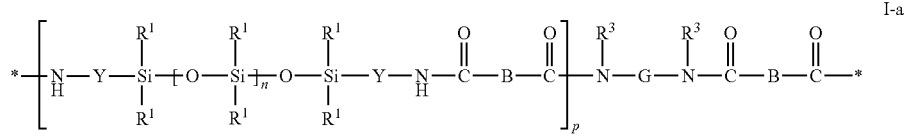

I-a

In this formula (I-a), each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and subscript p is an integer of 1 to 10. Group G is a divalent group that is the residue unit that is equal to a diamine of formula $R^3HN$-G-$NHR^3$ minus the two —$NHR^3$ groups (i.e., amino groups) where $R^3$ is hydrogen, alkyl, or forms a heterocyclic group when taken together with G and with the nitrogen to which it is attached. Each group B is independently a covalent bond, an alkylene of 4-20 carbons, an aralkylene, an arylene, or a combination thereof. When each group B is a covalent bond, the polydiorganosiloxane polyamide block copolymer of Formula I-a is referred to as a polydiorganosiloxane polyoxamide block copolymer, and preferably as the Formula I-b shown below. Each asterisk (*) indicates the position of attachment of the repeating unit to another group such as another repeat unit of Formula I-a.

A preferred linear, polydiorganosiloxane polyamide block copolymer useful in presently disclosed mixtures contains at least two repeat units of Formula I-b:

atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some embodiments, in some repeat units of Formula I (I-a or I-b), at least 40 percent, and preferably at least 50 percent, of the $R^1$ groups are phenyl, methyl, or combinations thereof For example, at least 60 percent, at least 70 percent, at least 80 percent, at least 90 percent, at least 95 percent, at least 98 percent, or at least 99 percent of the $R^1$ groups can be phenyl, methyl, or combinations thereof In some embodiments, in some repeat units of Formula I (I-a or I-b), at least

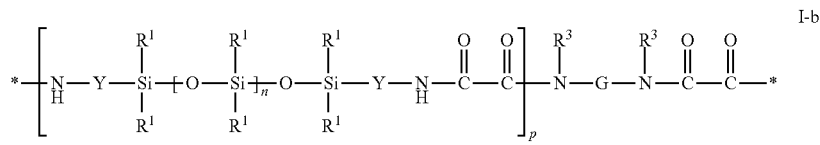

I-b 40 percent, and preferably at least 50 percent, of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I (I-a or I-b) is independently an alkylene, aralkylene, or a combination thereof Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I (I-a or I-b) is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula I (I-a or I-b) is a residual unit that is equal to a diamine compound of formula $R^3HN$-G-$NHR^3$ minus the two amino groups (i.e., —$NHR^3$ groups). The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula $H_2N$-G-$NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula III, which are described below, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

In preferred embodiments, the polydiorganosiloxane polyamide is a polydiorganosiloxane polyoxamide. The polydiorganosiloxane polyoxamide tends to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyamide is a linear, block copolymer and can be an elastomeric material. Unlike many of the known polydiorganosiloxane polyamides that are generally formulated as brittle solids or hard plastics, the polydiorganosiloxane polyamides can be formulated to include greater than 50 weight percent polydiorganosiloxane segments based on the weight of the copolymer. The weight percent of the diorganosiloxane in the polydiorganosiloxane polyamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyamides. Higher amounts of the polydiorganosiloxane can be used to prepare elastomeric materials with lower modulus while maintaining reasonable strength.

Some of the polydiorganosiloxane polyamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to 350° C. Additionally, the copolymers can often be heated at a temperature such as 250° C. for 1 hour in air without apparent degradation as determined by no detectable loss of mechanical strength upon cooling.

Certain embodiments of the copolymeric material of Formula I (I-a or I-b) can be optically clear. As used herein, the term "optically clear" refers to a material that is clear to the human eye. An optically clear copolymeric material often has a luminous transmission of at least 90 percent, a haze of less than 2 percent, and opacity of less than about 1 percent in the 400 to 700 nm wavelength range. Both the luminous transmission and the haze can be determined using, for example, the method of ASTM-D 1003-95.

Additionally, certain embodiments of the copolymeric material of Formula I (I-a or I-b) can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of 1.41 to 1.60.

The polydiorganosiloxane polyamides are soluble in many common organic solvents such as, for example, toluene, tetrahydrofuran, dichloromethane, aliphatic hydrocarbons (e.g., alkanes such as hexane), or mixtures thereof.

Polydiorganosiloxane urea-containing copolymers useful in mixtures of the present disclosure contain soft polydiorganosiloxane units, hard polyisocyanate residue units, terminal groups and optionally soft and/or hard organic polyamine residue units. Some polydiorganosiloxane urea-containing copolymers are commercially available under the trade designation "Geniomer 140" available from Wacker Chemie AG, Germany. The polyisocyanate residue is the polyisocyanate minus the —NCO groups, the organic polyamine residue is the organic polyamine minus the —NH groups, and the polyisocyanate residue is connected to the polydiorganosiloxane units or organic polyamine residues by urea linkages. The terminal groups may be non-functional groups or functional groups depending on the purpose of the polydiorganosiloxane urea segmented copolymer.

The polydiorganosiloxane urea containing copolymers useful in presently disclosed mixtures contains at least two repeat units of Formula II containing group, as described in U.S. Pat. Nos. 4,900,474 and 5,118,775, wherein such descriptions are incorporated herein by reference; preferably at least 50% of the R moieties are methyl radicals with the balance being monovalent alkyl or substituted alkyl radicals having 1 to 12 carbon atoms, alkenylene radicals, phenyl radicals, or substituted phenyl radicals; each Z is a polyvalent radical that is an arylene radical or an aralkylene radical preferably having from about 6 to 20 carbon atoms, an alkylene or cycloalkylene radical preferably having from about 6 to 20 carbon atoms, preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof; each Y is a polyvalent radical that independently is an alkylene radical preferably having 1 to 10 carbon atoms, an aralkylene radical or an arylene radical preferably having 6 to 20 carbon atoms; each D is independently selected from the group consisting of hydrogen, an alkyl radical of 1 to 10 carbon atoms, phenyl, and a radical that completes a ring structure including B or Y to form a heterocycle; B is a polyvalent radical selected from the group consisting of alkylene, aralkylene, cycloalkylene, phenylene, polyalkylene oxide, including for example, polyethylene oxide, polypropylene oxide, polytetramethylene oxide, and copolymers and mixtures thereof; m is a number that is 0 to about 1000; n is a

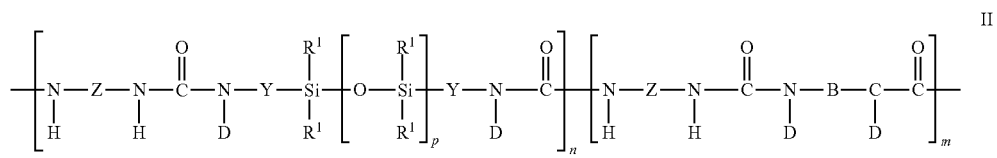

In this Formula II each R is a moiety that independently is an alkyl moiety preferably having about 1 to 12 carbon atoms and may be substituted with, for example, trifluoroalkyl or vinyl groups, a vinyl radical or higher alkenyl radical preferably represented by the formula —$R^2$ ($CH_2)_a$CH—$CH_2$ wherein $R^2$ is —$(CH_2)_b$— or —$(CH_2)_c$CH—CH— and a is 1, 2 or 3; b is 0, 3 or 6; and c is 3, 4 or 5, a cycloalkyl moiety having about 6 to 12 carbon atoms and may be substituted with alkyl, fluoroalkyl, and vinyl groups, or an aryl moiety preferably having about 6 to 20 carbon atoms and may be substituted with, for example, alkyl, cycloalkyl, fluoroalkyl and vinyl groups or R is a perfluoroalkyl group as described in U.S. Pat. No. 5,028,679, wherein such description is incorporated herein by reference, a fluorine-containing group, as described in U.S. Pat. No. 5,236,997, wherein such description is incorporated herein by reference, or a perfluoroethernumber that is equal to or greater than 1; and p is a number that is about 5 or larger, preferably about 15 to 2000, more preferably about 30 to 1500.

In the use of polyisocyanates (Z is a radical having a functionality greater than 2) and polyamines (B is a radical having a functionality greater than 2), the structure of Formula I (I-a or I-b) will be modified to reflect branching at the polymer backbone. In the use of endcapping agents, the structure of Formula II will be modified to reflect termination of the polydiorganosiloxane urea chain.

Methods of Making Polydiorganosiloxane Polyamide Copolymers

The linear block copolymers having repeat units of Formula I (I-a or I-b) can be prepared, for example, as represented in Reaction Scheme A.

Reaction Scheme A

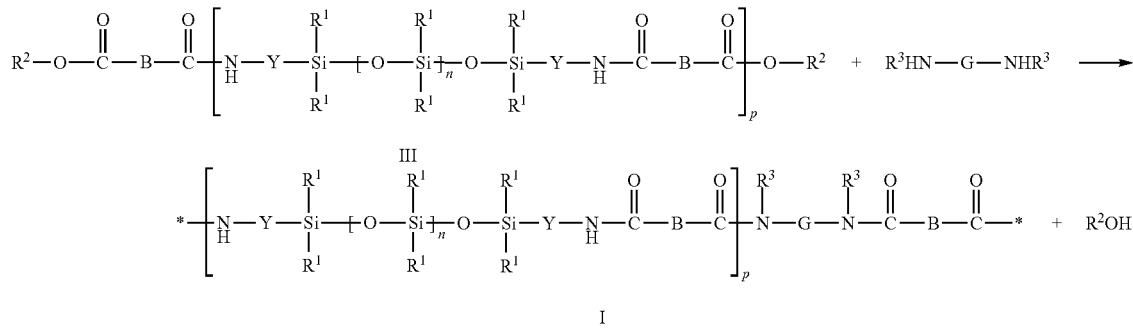

In this reaction scheme, a precursor of Formula I (I-a or I-b) is combined under reaction conditions with a diamine having two primary or secondary amino groups, two secondary amino groups, or one primary amino group and one secondary amino group. The diamine is usually of formula $R^3$HN-G-NH$R^3$. The $R^2$OH by-product is typically removed from the resulting polydiorganosiloxane polyamide.

The diamine $R^3$HN-G-NH$R^3$ in Reaction Scheme A has two amino groups (i.e., —NH$R^3$). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., the diamine is piperazine or the like). In most embodiments, $R^3$ is hydrogen or alkyl. In many embodiments, the diamine has two primary amino groups (i.e., each $R^3$ group is hydrogen) and the diamine is of formula H$_2$N-G-NH$_2$. The portion of the diamine exclusive of the two amino groups is referred to as group G in Formula I (I-a or I-b).

The diamines are sometimes classified as organic diamines or polydiorganosiloxane diamines with the organic diamines including, for example, those selected from alkylene diamines, heteroalkylene diamines, arylene diamines, aralkylene diamines, or alkylene-aralkylene diamines. The diamine has only two amino groups so that the resulting polydiorganosiloxane polyamides are linear block copolymers that are often elastomeric, molten at elevated temperatures, and soluble in some common organic solvents. The diamine is free of a polyamine having more than two primary or secondary amino groups. Tertiary amines that do not react with the precursor of Formula I (I-a or I-b) can be present. Additionally, the diamine is free of any carbonylamino group. That is, the diamine is not an amide.

Exemplary polyoxyalkylene diamines (i.e., G is a heteroalkylene with the heteroatom being oxygen) include, but are not limited to, those commercially available from Huntsman, The Woodlands, Tex. under the trade designation JEFFAMINE D-230 (i.e., polyoxypropylene diamine having an average molecular weight of 230 g/mole), JEFFAMINE D-400 (i.e., polyoxypropylene diamine having an average molecular weight of 400 g/mole), JEFFAMINE D-2000 (i.e., polyoxypropylene diamine having an average molecular weight of 2,000 g/mole), JEFFAMINE HK-511 (i.e., polyetherdiamine with both oxyethylene and oxypropylene groups and having an average molecular weight of 220 g/mole), JEFFAMINE ED-2003 (i.e., polypropylene oxide capped polyethylene glycol having an average molecular weight of 2,000 g/mole), and JEFFAMINE EDR-148 (i.e., triethyleneglycol diamine).

Exemplary alkylene diamines (i.e., G is a alkylene) include, but are not limited to, ethylene diamine, propylene diamine, butylene diamine, hexamethylene diamine, 2-methylpentamethylene 1,5-diamine (i.e., commercially available from DuPont, Wilmington, Del. under the trade designation DYTEK A), 1,3-pentane diamine (commercially available from DuPont under the trade designation DYTEK EP), 1,4-cyclohexane diamine, 1,2-cyclohexane diamine (commercially available from DuPont under the trade designation DHC-99), 4,4'-bis(aminocyclohexyl)methane, and 3-aminomethyl-3,5,5-trimethylcyclohexylamine.

Exemplary arylene diamines (i.e., G is an arylene such as phenylene) include, but are not limited to, m-phenylene diamine, o-phenylene diamine, and p-phenylene diamine. Exemplary aralkylene diamines (i.e., G is an aralkylene such as alkylene-phenyl) include, but are not limited to 4-aminomethyl-phenylamine, 3-aminomethyl-phenylamine, and 2-aminomethyl-phenylamine. Exemplary alkylene-aralkylene diamines (i.e., G is an alkylene-aralkylene such as alkylene-phenylene-alkylene) include, but are not limited to, 4-aminomethyl-benzylamine, 3-aminomethyl-benzylamine, and 2-aminomethyl-benzylamine.

The precursor of Formula III in Reaction Scheme A has at least one polydiorganosiloxane segment and at least two oxalylamino groups. Group $R^1$, group Y, subscript n, and subscript p are the same as described for Formula I (I-a or I-b). Each group $R^2$ is independently an alkyl, haloalkyl, aryl, or aryl substituted with an alkyl, alkoxy, halo, or alkoxycarbonyl. The precursor of Formula III can include a single compound (i.e., all the compounds have the same value of p and n) or can include a plurality of compounds (i.e., the compounds have different values for p, different values for n, or different values for both p and n). Precursors with different n values have siloxane chains of different length. Precursors having a p value of at least 2 are chain extended.

In some embodiments, the precursor is a mixture of a first compound of Formula III with subscript p equal to 1 and a second compound of Formula III with subscript p equal to at least 2. The first compound can include a plurality of different compounds with different values of n. The second compound can include a plurality of compounds with different values of p, different values of n, or different values of both p and n. Mixtures can include at least 50 weight percent of the first compound of Formula III (i.e., p is equal to 1) and no greater than 50 weight percent of the second compound of Formula III (i.e., p is equal to at least 2) based on the sum of the weight of the first and second compounds in the mixture. In some mixtures, the first compound is present in an amount of at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, or at least 98 weight percent based on the total amount of the compounds of Formula III. The mixtures often contain no greater than 50 weight percent, no greater than 45 weight percent, no greater than 40 weight percent, no greater than 35 weight percent, no greater than 30 weight percent, no greater than 25 weight percent, no greater than 20 weight percent, no greater than 15 weight percent, no greater than 10 weight percent, no greater than 5 weight percent, or no greater than 2 weight percent of the second compound.

Different amounts of the chain-extended precursor of Formula III in the mixture can affect the final properties of the elastomeric material of Formula I (I-a or I-b). That is, the amount of the second compound of Formula III (i.e., p equal to at least 2) can be varied advantageously to provide elastomeric materials with a range of properties. For example, a higher amount of the second compound of Formula III can alter the melt rheology (e.g., the elastomeric material can flow easier when present as a melt), alter the softness of the elastomeric material, lower the modulus of the elastomeric material, or a combination thereof.

Reaction Scheme A can be conducted using a plurality of precursors of Formula III, a plurality of diamines, or a combination thereof. A plurality of precursors having different average molecular weights can be combined under reaction conditions with a single diamine or with multiple diamines. For example, the precursor of Formula III may include a mixture of materials with different values of n, different values of p, or different values of both n and p. The multiple diamines can include, for example, a first diamine that is an organic diamine and a second diamine that is a polydiorganosiloxane diamine. Likewise, a single precursor can be combined under reaction conditions with multiple diamines.

For certain embodiments, the molar ratio of the precursor of Formula III to the diamine is often 1:1. For example, the molar ratio is often less than or equal to 1: 0.80, less than or equal to 1:0.85, less than or equal to 1:0.90, less than or equal to 1:0.95, or less than or equal to 1:1. The molar ratio is often greater than or equal to 1:1.05, greater than or equal to 1:1.10, or greater than or equal to 1:1.15. For example, the molar ratio can be in the range of 1:0.80 to 1:1.20, in the range of 1:0.80 to 1:1.15, in the range of 1:0.80 to 1:1.10, in the range of 1:0.80 to 1:1.05, in the range of 1:0.90 to 1:1.10, or in the range of 1:0.95 to 1:1.05.

For certain embodiments, the molar ratio of the precursor of Formula III to the diamine is less than 1:1.20 or greater than 1:0.80. For example, it can be 1:0.50, 1:0.55, 1:0.60, 1:0.65, 1:0.70, or 1:0.75, or it can be 1:1.25, 1:1.30, or 1:1.35. For example, the molar ratio can be in the range of less than 1:1.20 down to and including 1:2.00. Alternatively, it can be in the range of greater than 1:0.80 up to and including 1:0.50.

Varying the molar ratio can be used, for example, to alter the overall molecular weight, which can effect the rheology of the resulting copolymers. Additionally, varying the molar ratio can be used to provide oxalylamino-containing end groups or amino end groups, depending upon which reactant is present in molar excess.

The condensation reaction of the precursor of Formula III with the diamine (i.e., Reaction Scheme A) is often conducted at room temperature or at elevated temperatures such as at temperatures up to 250° C. For example, the reaction often can be conducted at room temperature or at temperatures up to 100° C. In other examples, the reaction can be conducted at a temperature of at least 100° C., at least 120° C., or at least 150° C. For example, the reaction temperature is often in the range of 100° C. to 220° C., in the range of 120° C. to 220° C., or in the range of 150° C. to 200° C. The condensation reaction is often complete in less than 1 hour, in less than 2 hours, in less than 4 hours, in less than 8 hours, or in less than 12 hours.

Reaction Scheme A can occur in the presence or absence of a solvent. Suitable solvents usually do not react with any of the reactants or products of the reactions. Additionally, suitable solvents are usually capable of maintaining all the reactants and all of the products in solution throughout the polymerization process. Exemplary solvents include, but are not limited to, toluene, tetrahydrofuran, dichloromethane, aliphatic hydrocarbons (e.g., alkanes such as hexane), or mixtures thereof.

Any solvent that is present can be stripped from the resulting polydiorganosiloxane polyamide at the completion of the reaction. Solvents that can be removed under the same conditions used to remove the alcohol by-product are often preferred. The stripping process is often conducted at a temperature of at least 100° C., at least 125° C., or at least 150° C. The stripping process is typically at a temperature less than 300° C., less than 250° C., or less than 225° C.

Conducting Reaction Scheme A in the absence of a solvent can be desirable because only the volatile by-product, $R^2OH$, needs to be removed at the conclusion of the reaction. Additionally, a solvent that is not compatible with both reactants and the product can result in incomplete reaction and a low degree of polymerization.

Any suitable reactor or process can be used to prepare the copolymeric material according to Reaction Scheme A. The reaction can be conducted using a batch process, semi-batch process, or a continuous process. Exemplary batch processes can be conducted in a reaction vessel equipped with a mechanical stirrer such as a Brabender mixer, provided the product of the reaction is in a molten state has a sufficiently low viscosity to be drained from the reactor. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

In many processes, the components are metered and then mixed together to form a reaction mixture. The components can be metered volumetrically or gravimetrically using, for example, a gear, piston or progressing cavity pump. The components can be mixed using any known static or dynamic method such as, for example, static mixers, or compounding mixers such as single or multiple screw extruders. The reaction mixture can then be formed, poured, pumped, coated, injection molded, sprayed, sputtered, atomized, stranded or sheeted, and partially or completely polymerized. The partially or completely polymerized material can then optionally be converted to a particle, droplet, pellet, sphere, strand, ribbon, rod, tube, film, sheet, coextruded film, web, nonwoven, microreplicated structure, or other continuous or discrete shape, prior to the transformation to solid polymer. Any of these steps can be conducted in the presence or absence of applied heat. In one exemplary process, the components can be metered using a gear pump, mixed using a static mixer, and injected into a mold prior to solidification of the polymerizing material.

The polydiorganosiloxane-containing precursor of Formula III in Reaction Scheme A can be prepared by any known method. In some embodiments, this precursor is prepared according to Reaction Scheme B.

Reaction Scheme B

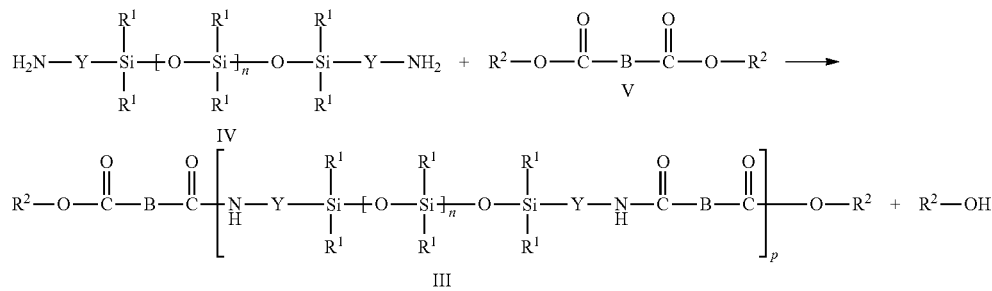

A polydiorganosiloxane diamine of Formula IV (p moles) is reacted with a molar excess of an oxalate of Formula V (greater than p+1 moles) under an inert atmosphere to produce the polydiorganosiloxane-containing precursor of Formula III and $R^2$-OH by-product. In this reaction, $R^1$, Y, n, and p are the same as previously described for Formula I (I-a or I-b). Each $R^2$ in Formula V is independently an alkyl, haloalkyl, aryl, or aryl substituted with an alkyl, alkoxy, halo, or alkoxycarbonyl. The preparation of the precursor of Formula III according to Reaction Scheme B is further described in Applicant's Assignee's copending U.S. Patent Publ. No. 2007/149745 A1 (Leir et al.), filed on Dec. 23, 2005.

The polydiorganosiloxane diamine of Formula V in Reaction Scheme B can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.), incorporated herein by reference in their entirety. Some polydiorganosiloxane diamines are commercially available, for example, from Shin Etsu Silicones of America, Inc., Torrance, Calif. and from Gelest Inc., Morrisville, Pa.

A polydiorganosiloxane diamine having a molecular weight greater than 2,000 g/mole or greater than 5,000 g/mole can be prepared using the methods described in U.S. Pat. No. 5,214,119 (Leir et al.), U.S. Pat. No. 5,461,134 (Leir et al.), and U.S. Pat. No. 5,512,650 (Leir et al.). One of the described methods involves combining under reaction conditions and under an inert atmosphere (a) an amine functional end blocker of the following formula

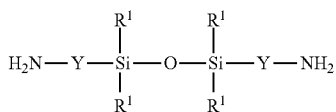

where Y and $R^1$ are the same as defined for Formula I (I-a or I-b); (b) sufficient cyclic siloxane to react with the amine functional end blocker to form a polydiorganosiloxane diamine having a molecular weight less than 2,000 g/mole; and (c) an anhydrous aminoalkyl silanolate catalyst of the following formula

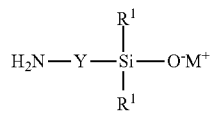

where Y and $R^1$ are the same as defined in Formula I (I-a or I-b) and $M^+$ is a sodium ion, potassium ion, cesium ion, rubidium ion, or tetramethylammonium ion. The reaction is continued until substantially all of the amine functional end blocker is consumed and then additional cyclic siloxane is added to increase the molecular weight. The additional cyclic siloxane is often added slowly (e.g., drop wise). The reaction temperature is often conducted in the range of 80° C. to 90° C. with a reaction time of 5 to 7 hours. The resulting polydiorganosiloxane diamine can be of high purity (e.g., less than 2 weight percent, less than 1.5 weight percent, less than 1 weight percent, less than 0.5 weight percent, less than 0.1 weight percent, less than 0.05 weight percent, or less than 0.01 weight percent silanol impurities). Altering the ratio of the amine end functional blocker to the cyclic siloxane can be used to vary the molecular weight of the resulting polydiorganosiloxane diamine of Formula IV.

Another method of preparing the polydiorganosiloxane diamine of Formula IV includes combining under reaction conditions and under an inert environment (a) an amine functional end blocker of the following formula

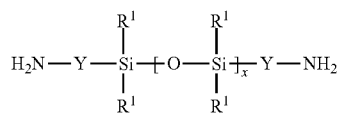

where $R^1$ and Y are the same as described for Formula I (I-a or I-b) and where the subscript x is equal to an integer of 1 to 150; (b) sufficient cyclic siloxane to obtain a polydiorganosiloxane diamine having an average molecular weight greater than the average molecular weight of the amine functional end blocker; and (c) a catalyst selected from cesium hydroxide, cesium silanolate, rubidium silanolate, cesium polysiloxanolate, rubidium polysiloxanolate, and mixtures thereof. The reaction is continued until substantially all of the amine functional end blocker is consumed. This method is further described in U.S. Pat. No. 6,355,759 B1 (Sherman et al.). This procedure can be used to prepare any molecular weight of the polydiorganosiloxane diamine.

Yet another method of preparing the polydiorganosiloxane diamine of Formula IV is described in U.S. Pat. No. 6,531,620 B2 (Brader et al.). In this method, a cyclic silazane is reacted with a siloxane material having hydroxy end groups as shown in the following reaction.

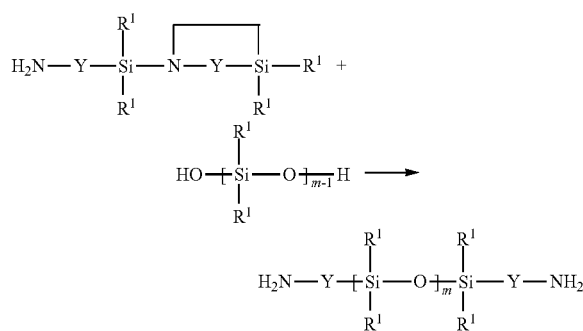

The groups $R^1$ and Y are the same as described for Formula I (I-a or I-b). The subscript m is an integer greater than 1.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

In Reaction Scheme B, an oxalate of Formula V is reacted with the polydiorganosiloxane diamine of Formula IV under an inert atmosphere. The two $R^2$ groups in the oxalate of Formula V can be the same or different. In some methods, the two $R^2$ groups are different and have different reactivity with the polydiorganosiloxane diamine of Formula IV in Reaction Scheme B.

Group $R^2$ can be an alkyl, haloalkyl, aryl, or aryl substituted with an alkyl, alkoxy, halo, or alkoxycarbonyl. Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl).

The oxalates of Formula V in Reaction Scheme B can be prepared, for example, by reaction of an alcohol of formula $R^2$—OH with oxalyl dichloride. Commercially available oxalates of Formula V (e.g., from Sigma-Aldrich, Milwaukee, Wis. and from VWR International, Bristol, Conn.) include, but are not limited to, dimethyl oxalate, diethyl oxalate, di-n-butyl oxalate, di-tert-butyl oxalate, bis(phenyl) oxalate, bis(pentafluorophenyl)oxalate, 1-(2,6-difluorophenyl)-2-(2,3,4,5,6-pentachlorophenyl)oxalate, and bis (2,4,6-trichlorophenyl)oxalate.

A molar excess of the oxalate is used in Reaction Scheme B. That is, the molar ratio of oxalate to polydiorganosiloxane diamine is greater than the stoichiometric molar ratio, which is (p+1): p. The molar ratio is often greater than 2:1, greater than 3:1, greater than 4:1, or greater than 6:1. The condensation reaction typically occurs under an inert atmosphere and at room temperature upon mixing of the components.

The condensation reaction used to produce the precursor of Formula III (i.e., Reaction Scheme B) can occur in the presence or absence of a solvent. In some methods, no solvent or only a small amount of solvent is included in the reaction mixture. In other methods, a solvent may be included such as, for example, toluene, tetrahydrofuran, dichloromethane, or aliphatic hydrocarbons (e.g., alkanes such as hexane).

Removal of excess oxalate from the precursor of Formula III prior to reaction with the diamine in Reaction Scheme A tends to favor formation of an optically clear polydiorganosiloxane polyamide. The excess oxalate can typically be removed from the precursor using a stripping process. For example, the reacted mixture (i.e., the product or products of the condensation reaction according to Reaction Scheme B) can be heated to a temperature up to 150° C., up to 175° C., up to 200° C., up to 225° C., or up to 250° C. to volatilize the excess oxalate. A vacuum can be pulled to lower the temperature that is needed for removal of the excess oxalate. The precursor compounds of Formula III tend to undergo minimal or no apparent degradation at temperatures in the range of 200° C. to 250° C. or higher. Any other known methods of removing the excess oxalate can be used.

The by-product of the condensation reaction shown in Reaction Scheme B is an alcohol (i.e., $R^2$—OH is an alcohol). Group $R^2$ is often limited to an alkyl having 1 to 4 carbon atoms, a haloalkyl having 1 to 4 carbon atoms, or an aryl such as phenyl that form an alcohol that can be readily removed (e.g., vaporized) by heating at temperatures no greater than 250° C. Such an alcohol can be removed when the reacted mixture is heated to a temperature sufficient to remove the excess oxalate of Formula V.

Reactive Components of the Polydiorganosiloxane Urea Containing Copolymers

Different polyisocyanates in the reaction will modify the properties of the polydiorganosiloxane urea containing copolymer in varying ways. For example, if a polycarbodiimide-modified diphenylmethane diisocyanate, such as ISONATE™ 143L, available from Dow Chemical Co., is used, the resulting polydiorganosiloxane urea containing copolymer has enhanced solvent resistance when compared with copolymers prepared with other diisocyanates. If tetramethyl-m-xylylene diisocyanate is used, the resulting segmented copolymer has a very low melt viscosity that makes it particularly useful for injection molding.

Diisocyanates useful in the presently disclosed process for preparing polydiorganosiloxane urea containing copolymers can be represented by the formula

OCN—Z—NCO (VI).

Any diisocyanate that can react with a polyamine, and in particular with polydiorganosiloxane diamine of Formula III can be used in the present disclosure. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl)diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, and cyclohexylene-1,4-diisocyanate and mixtures thereof.

Preferred diisocyanates include 2,6-toluene diisocyanate, methylenediphenylene-4,4'-diisocyanate, polycarbodiimide-modified methylenediphenyl diisocyanate, 4,4'-diisocyanato-3,3'-dimethoxybiphenyl(o-dianisidine diisocyanate), tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 1,6-diisocyanatohexane, 2,2,4-trimethylhexyl diisocyanate, and cyclohexylene-1,4-diisocyanate. Particularly preferred is tetramethyl-m-xylylene diisocyanate. Polydiorganosiloxane urea containing copolymers produced using tetramethyl-m-xylylene diisocyanate generally have lower melt viscosities than similar copolymers produced using other diisocyanates, and a higher modulus.

Any triisocyanate that can react with a polyamine, and in particular with polydiorganosiloxane diamine of the following Formula VII, can be used in the present disclosure. Examples of such triisocyanates include, but are not limited to, polyfunctional isocyanates, such as those produced from biurets, isocyanurates, adducts and the like. Some commercially available polyisocyanates include portions of the DESMODUR™ and MONDUR™ series from Bayer and the PAPI™ series of Dow Plastics.

Preferred triisocyanates include DESMODUR™ N-3300 and MONDUR™ 489.

Polydiorganosiloxane diamines useful in the presently disclosed process of preparing polydiorganosiloxane urea containing copolymers can be represented by the Formula VII.

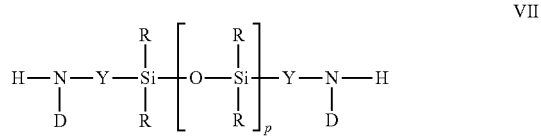

VII where each of R, Y, D, and p are defined as above. Generally, the number average molecular weight of the polydiorganosiloxane diamines useful in the present disclosure are greater than about 700.

Polydiorganosiloxane diamines (also referred to as silicone diamines) useful in the present invention are any which fall within Formula VII above and including those having molecular weights in the range of about 700 to 150,000. Polydiorganosiloxane diamines are disclosed, for example, in U.S. Pat. Nos. 3,890,269, 4,661,577, 5,026,890, 5,214,119, 5,276,122, 5,461,134 and 5,512,650, each of which is incorporated herein by reference.

Polydiorganosiloxane diamines are commercially available from, for example, Shin Etsu Silicones of America, Inc., Torrance, Calif., and Hills America, Inc. Preferred are substantially pure polydiorganosiloxane diamines prepared as disclosed in U.S. Pat. No. 5,214,119 which is incorporated herein by reference. The polydiorganosiloxane diamines having such high purity are prepared from the reaction of cyclic organosilanes and bis(aminoalkyl)disiloxanes utilizing an anhydrous amino alkyl functional silanolate catalyst such as tetramethylammonium-3-aminopropyldimethyl silanolate, preferably in an amount less than 0.15 weight percent based on the weight of the total amount of cyclic organosiloxane with the reaction run in two stages. Particularly preferred polydiorganosiloxane diamines are prepared using cesium and rubidium catalysts and are disclosed in U.S. Pat. No. 5,512,650.

Examples of polydiorganosiloxane diamines useful in the present invention include but are not limited to polydimethylsiloxane diamine, polydiphenylsiloxane diamine, poly trifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and copolymers and mixtures thereof Examples of organic polyamines useful in the present invention include but are not limited to polyoxyalkylene diamine, such as D-230, D-400, D-2000, D-4000, DU-700, ED-2001 and EDR-148, all available from Huntsman, polyoxyalkylene triamine, such as T-3000 and T-5000 available from Huntsman, polyalkylenes, such as DYTEK™ A and DYTEK™ EP, available from DuPont and mixtures thereof.

Once the reaction of the polyisocyanate with the polyamine has occurred, active hydrogens in the urea linkage may still be available for reaction with excess isocyanate. By increasing the ratio of isocyanate to amine, the formation of biuret moieties may be facilitated, especially at higher temperatures, resulting in branched or crosslinked polymer. Low to moderate amounts of biuret formation can be advantageous to shear properties and solvent resistance.

The nature of the isocyanate residue in the polydiorganosiloxane urea containing component influences stiffness and flow properties, and also affects the properties of the mixtures. Isocyanate residues resulting from diisocyanates that form crystallizable ureas, such as tetramethyl-m-xylylene diisocyanate, 1,12-dodecane diisocyanate, dianisidine diisocyanate, provide mixtures that can be stiffer, if sufficient polydiorganosiloxane urea containing component is used, than those prepared from methylenedicyclohexylene-4,4'-diisocyanate, 3-isocyanatomethyl-3,5,5-trimethylcyclohexyl isocyanate, and m-xylylene diisocyanate.

Optional endcapping agents may be incorporated, as needed, to introduce non-functional moisture curable or free radically curable moieties into the polydiorganosiloxane urea containing copolymer. The agents are reactive with either amines or isocyanates.

Crosslinking agents, if desired may be used, for example silane agents may be used to crosslink moisture curable polydiorganosiloxane urea containing copolymers or photoinitiators can be used for free-radically curable polydiorganosiloxanes urea containing copolymers. When used, the amounts of such components are those that are suitable for the purpose intended and are typically used at a concentration of from about 0.1% to about 5% by weight of the total polymerizable composition.

Optional Additives

Functional components, tackifiers, plasticizers, and other property modifiers may be incorporated in the thermoplastic component, the thermoplastic silicone-based PPA component, or both of the components of the presently disclosed mixtures. Preferred optional additives are not hot melt processable. That is, they do not melt and flow at the temperatures at which the hot melt processable thermoplastic component and the thermoplastic silicone-based PPA component melt and flow.

Functional components include, for example, antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, fumed silica, glass beads, glass bubbles, glass fibers, mineral fibers, clay particles, organic fibers, e.g., nylon, KEVLAR, metal particles, and the like. Such optional additives can be added in amounts up to 100 parts per 100 parts of the sum of the thermoplastic component and the thermoplastic silicone-based PPA component, provided that if and when incorporated, such additives are not detrimental to the function and functionality of the final mixture and/or articles derived therefrom. Other additives such as light diffusing materials, light absorptive materials and optical brighteners, flame retardants, stabilizers, antioxidants, compatibilizers, antimicrobial agents such as zinc oxide, electrical conductors, thermal conductors such as aluminum oxide, boron nitride, aluminum nitride, and nickel particles, including organic and/or inorganic particles, or any number or combination thereof, can be blended into these systems. The functional components listed above may also be incorporated into the thermoplastic silicone-based PPA component provided such incorporation does not adversely affect any of the resulting product to an undesirable extent.

Processes of Making Compositions and Constructions

The presently disclosed compositions and constructions can be made by solvent-based processes known to the art, by a solventless process, or by a combination of the two.

One skilled in the art can expect the optimum mixture to be a function of the architecture and ratios of the thermoplastic silicone-based PPA component, the architecture and ratios of the thermoplastic component, optional initiator architecture, and whether any functional components, additives, or property modifiers are added.

The thermoplastic component is generally added as a molten stream to the thermoplastic silicone-based PPA component or to one of the reactants of the thermoplastic silicone-based PPA component. Sometimes the thermoplastic component needs to be melted in a separate vessel before the thermoplastic silicone-based PPA component is added (1) as pellets, (2) as reactants or (3) as a separate molten stream from a second vessel. Examples when a separate vessel is preferred include, for example, when (1) additives are preferred to concentrate in the thermoplastic component, and (2) thermoplastic component(s) require high processing temperatures.

The order of adding the various components is important in forming the mixture. If the thermoplastic component is substantially unreactive with the reactants for making the thermoplastic silicone-based PPA as discussed earlier, any order of addition can be used. The thermoplastic silicone-based PPA component can be added to the thermoplastic component, and vice versa, or the thermoplastic silicone-based PPA component can be made in the presence of the thermoplastic component. Also, the thermoplastic component is preferably sufficiently heated to a processable state in a separate vessel and added to a molten stream of the thermoplastic silicone-based PPA component if the temperature needed to process the thermoplastic component would degrade the thermoplastic silicone-based PPA component.

Other additives such as plasticizing materials, tackifying materials, pigments, fillers, initiators, and the like can generally be added at any point in the process since they are usually not reactive with the reactants but are typically added after a substantial amount of the thermoplastic silicone-based PPA component is formed.

Four process considerations can affect the final properties of the mixtures made by the solventless process. First, the properties of thermoplastic silicone-based PPA component could be affected by whether the thermoplastic silicone-based PPA component is made in a solvent or an essentially solventless process. Second, the thermoplastic silicone-based PPA component can degrade if exposed to too much heat and shear. Third, the stability of the mixture is affected by how the thermoplastic silicone-based PPA component is mixed with the thermoplastic component. Fourth, the morphology of the article made with the mixture is determined by the interaction of the processing parameters and characteristics of the components in the mixture.

In a first consideration, the thermoplastic silicone-based PPA component can be made previously by either a solvent or solventless process or can be made in the presence of the thermoplastic component. Methods of making the thermoplastic silicone-based PPA component in solvent were disclosed above. Methods of making the thermoplastic silicone-based PPA component in substantially solventless conditions can result in thermoplastic silicone-based PPA component high in molecular weight.

In a second consideration, the thermoplastic silicone-based PPA component can degrade if it is heated too much under shear conditions, particularly in the presence of oxygen. The thermoplastic silicone-based PPA component is exposed to the least amount of heat and shear when made in the presence of the thermoplastic component, and in particular, when the mixture is made under an inert atmosphere.

In a third consideration, the stability of the mixture is affected by how the thermoplastic silicone-based PPA component is mixed with the thermoplastic component. Thermoplastic silicone-based PPA's are generally immiscible with most other polymeric materials. However, the inventors have found that a wide variety of polymers can be mixed with a thermoplastic silicone-based PPA component when both are in the molten state. Care must be taken that the conditions needed to soften one component does not degrade the other. Preferably, the mixing temperature should be at a temperature above the mixing and conveying temperature of the mixture and below the degradation temperature of the thermoplastic silicone-based PPA component. The thermoplastic silicone-based PPA component can usually be subjected to elevated temperatures up to 250° C. or higher without apparent degradation.

Any vessel in which the components can be adequately heated and mixed in the molten state is suitable for making mixtures of the invention.

In a fourth consideration, the processing steps influence the morphology of an article made with the mixtures of the invention. The mixtures generally have at least two domains, one discontinuous and the other continuous, because of the general immiscibility of the thermoplastic silicone-based PPA component with the thermoplastic component. The component comprising the minor phase typically forms discontinuous domains that range in shape from spheroidal to ellipsoidal to ribbon-like to fibrous. The component comprising the major phase typically forms the continuous domain that surrounds the discontinuous domains. The discontinuous domains of the mixture generally elongate if the mixture is subjected to sufficient shear or extensional forces as the mixture is formed into an article. The discontinuous domains generally remain elongated if at least one of the components has a sufficient viscosity at use temperature to prevent the elongated domain from relaxing into a sphere when the mixture is no longer under extensional or shear forces. The elongated morphology is usually stable until the mixture is reheated above the softening point of the components.

based PPA component ranging from 0.01 wt % to 10 wt % based on the total weight of the article.

EXAMPLES

These examples are merely for illustrative purposes only and are not meant to be limiting on the scope of the appended claims. All parts, percentages, ratios, and the like in the examples are by weight, unless noted otherwise. Solvents and other reagents used were obtained from Sigma-Aldrich Chemical Company; Milwaukee, Wis. unless otherwise noted.

Table of Materials

| Acronym | Description |
| --- | --- |
| S POLYMER 33K | A polydiorganosiloxane polyamide with a density of about 1.0214 g/cc at 25° C., a refractive index of about 1.407 and a molecular weight of the silicone block being 33,000 g/mole that was prepared as described in U.S. Patent Appln. Ser. No. 11/821,568 (Sherman et al.) filed on Jun. 22, 2007. |
| S POLYMER 14K | A polydiorganosiloxane polyamide with a density of about 1.0214 g/cc at 25° C., a refractive index of about 1.409 and a molecular weight of the silicone block being 14,000 g/mole that was prepared as described in U.S. Patent Appln. Ser. No. 11/821,568 (Sherman et al.) filed on Jun. 22, 2007. |
| SILICONE POLY UREA BLOCK POLYMER | A polydiorganosiloxane urea containing copolymer with a density of about 0.955 g/cc at 25° C. and a refractive index of about 1.424 commercially available under the trade designation "Geniomer 140" from Wacker Chemie AG, Munich, Germany. |
| DOW HDPE DMDA-8904 NT7 | A high density polyethylene (HDPE) having a melt index (MI) of about 4.4 and a density of about 0.952 g/cc commercially available from DOW Plastics an affiliate of the DOW Chemical Co., Michigan USA. |
| EXXONMOBIL, HD 6908.19 | An HDPE having an MI of about 8.2 and a density of about 0.965 g/cc commercially available from EXXONMOBIL, Texas USA. |
| EXXONMOBIL, HD 6719.17 | An HDPE having an MI of about 19 and a density of about 0.952 g/cc commercially available from EXXONMOBIL, Texas USA. |
| DOW IP 40 | An HDPE having an MI of about 40 and a density of about 0.952 g/cc commercially available from DOW Plastics an affiliate of the DOW Chemical Co., Michigan USA. |
| EXXONMOBIL CPP 1042 | A polypropylene homopolymer having an MFR of 1.9 and a density of 0.9 g/cc commercially available from EXXONMOBIL, Texas USA. |
| EXXONMOBIL 1404 FC | A polypropylene homopolymer having an MFR of 23 and a density of 1.23 g/cc commercially available from EXXONMOBIL, Texas USA. |
| EXXONMOBIL Achieve 3854 | A metallocene catalyzed polypropylene homopolymers having an MFR 24 and a density of 0.9 g/cc commercially available from EXXONMOBIL, Texas USA |
| DMS-T72 | A polydimethylsiloxane having a viscosity of 20,000,000 centistokes and a refractive index of about 1.406 commercially available from Gelest Inc., Morrisville, Pennsylvania. |

While both a solvent based process and a solventless process for making the presently disclosed mixtures, there may be some situations where a combination of the two is preferred. In the latter case, the thermoplastic silicone-based PPA component could be made by the solvent based process and subsequently dried and melt mixed with the thermoplastic component.

Various articles can be made using the disclosed mixtures. These articles can be made by various methods, including, melt mixing the thermoplastic component and the thermoplastic silicone-based PPA component to form a mixture, and injection molding the mixture. Melt mixing can done by batch blending or extrusion.

These articles include injection molded tubes, bottles tube fittings, and the like. Articles made using the disclosed mixtures have a weight percent of the thermoplastic silicone- Injection Molding Method Examples 1-32 and Comparative Examples 1-19 presented below were injection molded on a 110 T electric injection molding machine (commercially available as a Fanuc Roboshot 110R injection molding machine from Cincinnati Milacron, Batavia, Ohio) using a standard four cavity mold pursuant to ASTM D3641. The volume of the ASTM D3641 flex bar mold cavity used for the examples was 5.15 cc. The other mold cavities were closed during preparation of the examples herein.

A barrel on the injection molding machine was set to a particular processing temperature according to the data below and filled with molten polymer, which was held in a defined volume in front of a screw positioned upstream from the barrel. The volume was selected according to the part volume of the article being made and the runner to be injected. The mold was initially in the open position.

The cycle began by closing the mold. The barrel then moved forward to make contact with the sprue gate of the mold. The molten polymer was then injected into the mold cavity going through the runner at a pre-determined injection pressure and rate of injection followed by pack pressure to fill the mold cavity.

A transition point was reached after which a pre-determined pack pressure according to the data below was applied for a defined pack time based on when the polymer fully solidified in the gate of the mold cavity. The purpose of this step was to compensate for shrinkage of the polymer due to the crystallization process during cooling. This step minimized shrinkage of the injection molded article.

In some instances, extra cooling time was allowed for adequate crystallization of the injection molded article. The barrel was disengaged from the mold sprue and used to prepare polymer for the next molding cycle.

The clamp was opened and the injection molded article was ejected using ejection pins assembled in an ejector plate. The injection molding machine was prepared for the next molding cycle.

The ejected molded article consisted of a runner and a flex specimen attached to the runner. The flex specimen was separated using pliers. The flex specimen was weighed on an electronic scale and the weight was recorded. Using the density of the components being injection molded and the measured part (or specimen) weight, the part volume was calculated in cubic centimeters (cc). Based on the mold cavity volume of 5.15 cubic centimeters (cc) and the calculated part volume, the part shrinkage was calculated for each injection molded article. This data is recorded in Tables I-V below.

Compounding Method

The Examples are based on mixtures of the thermoplastic component and the thermoplastic silicone-based PPA component that were compounded on a Haake 19 mm twin screw at 200° C. The rate of addition for the pellet to pellet blended formulation was 47 g/minute, which was compounded using a 90 screw RPM using a four strand die. The strands were pulled through a cold water bath and cut into pellets. These pellets were then injection molded.

Comparative Example 1

100 wt % DOW DMDA-8904 was injection molded according to the Injection Molding Method described above using a melt temperature of 210° C., a packing pressure of 400 bar and a pack time of 25 seconds. The part weight was measured to be 4.60 grams (g). The part volume was calculated to be 4.83 cc using a density of 0.952 g/cc and the part weight. The part shrinkage was calculated as 6.27%.

Example 1

99 wt % DOW DMDA-8904 was compounded with 1 wt % S POLYMER 33K according to the Compounding Method described above. The resulting formulation was injection molded according to the Injection Molding Method described above using a melt temperature of 210° C., a packing pressure of 400 bar and a pack time of 25 seconds. The part weight was measured to be 4.61 grams (g). The part volume was calculated to be 4.83 cc using a density of 0.953 g/cc and the part weight. The part shrinkage was calculated as 6.07%.

Comparative Example 2

100 wt % DOW DMDA-8904 was injection molded according to the Injection Molding Method described above using a melt temperature of 210° C., a packing pressure of 400 bar and a pack time of 20 seconds. The part weight was measured to be 4.60 grams (g). The part volume was calculated to be 4.83 cc using a density of 0.952 g/cc and the part weight. The part shrinkage was calculated as 6.27%.

Example 2

99 wt % DOW DMDA-8904 was compounded with 1 wt % S POLYMER 33K according to the Compounding Method described above. The resulting formulation was injection molded according to the Injection Molding Method described above using a melt temperature of 210° C., a packing pressure of 400 bar and a pack time of 20 seconds. The part weight was measured to be 4.61 grams (g). The part volume was calculated to be 4.83 cc using a density of 0.953 g/cc and the part weight. The part shrinkage was calculated as 6.07%.

Comparative Example 3

100 wt % DOW DMDA-8904 was injection molded according to the Injection Molding Method described above using a melt temperature of 210° C., a packing pressure of 400 bar and a pack time of 15 seconds. The part weight was measured to be 4.58 grams (g). The part volume was calculated to be 4.81 cc using a density of 0.952 g/cc and the part weight. The part shrinkage was calculated as 6.58%.

Example 3

99 wt % DOW DMDA-8904 was compounded with 1 wt % S POLYMER 33K according to the Compounding Method described above. The resulting formulation was injection molded according to the Injection Molding Method described above using a melt temperature of 210° C., a packing pressure of 400 bar and a pack time of 15 seconds. The part weight was measured to be 4.59 grams (g). The part volume was calculated to be 4.81 cc using a density of 0.953 g/cc and the part weight. The part shrinkage was calculated as 6.48%.

Comparative Example 4

100 wt % DOW DMDA-8904 was injection molded according to the Injection Molding Method described above using a melt temperature of 210° C., a packing pressure of 400 bar and a pack time of 10 seconds. The part weight was measured to be 4.52 grams (g). The part volume was calculated to be 4.75 cc using a density of 0.952 g/cc and the part weight. The part shrinkage was calculated as 7.81%.

Example 4

99 wt % DOW DMDA-8904 was compounded with 1 wt % S POLYMER 33K according to the Compounding Method described above. The resulting formulation was injection molded according to the Injection Molding Method described above using a melt temperature of 210° C., a packing pressure of 400 bar and a pack time of 10 seconds. The part weight was measured to be 4.52 grams (g). The part volume was calculated to be 4.75 cc using a density of 0.953 g/cc and the part weight. The part shrinkage was calculated as 7.75%.

Comparative Example 5

100 wt % DOW DMDA-8904 was injection molded according to the Injection Molding Method described above using a melt temperature of 210° C., a packing pressure of 800 bar and a pack time of 25 seconds. The part weight was measured to be 4.66 grams (g). The part volume was calculated to be 4.89 cc using a density of 0.952 g/cc and the part weight. The part shrinkage was calculated as 5.01%. Physical properties were tested according to ASTM D 790 Method B using a support span of 50.8 mm, a rate of specimen loading of 13.55 mm/min and recorded in Table IV.

Example 5

99 wt % DOW DMDA-8904 was compounded with 1 wt % S POLYMER 33K according to the Compounding Method described above. The resulting formulation was injection molded according to the Injection Molding Method described above using a melt temperature of 210° C., a packing pressure of 800 bar and a pack time of 25 seconds. The part weight was measured to be 4.71 grams (g). The part volume was calculated to be 4.95 cc using a density of 0.953 g/cc and the part weight. The part shrinkage was calculated as 3.85%. Physical properties were tested according to ASTM D 790 Method B using a support span of 50.8 mm, a rate of specimen loading of 13.55 mm/min and recorded in Table IV.

Comparative Example 6

100 wt % DOW DMDA-8904 was injection molded according to the Injection Molding Method described above using a melt temperature of 210° C., a packing pressure of 800 bar and a pack time of 20 seconds. The part weight was measured to be 4.66 grams (g). The part volume was calculated to be 4.90 cc using a density of 0.952 g/cc and the part weight. The part shrinkage was calculated as 4.91%.

Example 6

99 wt % DOW DMDA-8904 was compounded with 1 wt % S POLYMER 33K according to the Compounding Method described above. The resulting formulation was injection molded according to the Injection Molding Method described above using a melt temperature of 210° C., a packing pressure of 800 bar and a pack time of 20 seconds. The part weight was measured to be 4.71 grams (g). The part volume was calculated to be 4.95 cc using a density of 0.953 g/cc and the part weight. The part shrinkage was calculated as 3.85%.

Comparative Example 7

100 wt % DOW DMDA-8904 was injection molded according to the Injection Molding Method described above using a melt temperature of 210° C., a packing pressure of 800 bar and a pack time of 15 seconds. The part weight was measured to be 4.65 grams (g). The part volume was calculated to be 4.88 cc using a density of 0.952 g/cc and the part weight. The part shrinkage was calculated as 5.24%.

Example 7

99 wt % DOW DMDA-8904 was compounded with 1 wt % S POLYMER 33K according to the Compounding Method described above. The resulting formulation was injection molded according to the Injection Molding Method described above using a melt temperature of 210° C., a packing pressure of 800 bar and a pack time of 15 seconds. The part weight was measured to be 4.67 grams (g). The part volume was calculated to be 4.90 cc using a density of 0.953 g/cc and the part weight. The part shrinkage was calculated as 4.79%.

Comparative Example 8

100 wt % DOW DMDA-8904 was injection molded according to the Injection Molding Method described above using a melt temperature of 210° C., a packing pressure of 800 bar and a pack time of 10 seconds. The part weight was measured to be 4.58 grams (g). The part volume was calculated to be 4.81 cc using a density of 0.952 g/cc and the part weight. The part shrinkage was calculated as 6.65%.

Example 8

99 wt % DOW DMDA-8904 was compounded with 1 wt % S POLYMER 33K according to the Compounding Method described above. The resulting formulation was injection molded according to the Injection Molding Method described above using a melt temperature of 210° C., a packing pressure of 800 bar and a pack time of 10 seconds. The part weight was measured to be 4.57 grams (g). The part volume was calculated to be 4.79 cc using a density of 0.953 g/cc and the part weight. The part shrinkage was calculated as 6.85%.

Example 9

97 wt % DOW DMDA-8904 was compounded with 3 wt % S POLYMER 33K according to the Compounding Method described above. The resulting formulation was injection molded according to the Injection Molding Method described above using a melt temperature of 210° C., a packing pressure of 400 bar and a pack time of 25 seconds. The part weight was measured to be 4.66 grams (g). The part volume was calculated to be 4.89 cc using a density of 0.953 g/cc and the part weight. The part shrinkage was calculated as 4.91%.

Example 10

97 wt % DOW DMDA-8904 was compounded with 3 wt % S POLYMER 33K according to the Compounding Method described above. The resulting formulation was injection molded according to the Injection Molding Method described above using a melt temperature of 210° C., a packing pressure of 400 bar and a pack time of 20 seconds. The part weight was measured to be 4.65 grams (g). The part volume was calculated to be 4.87 cc using a density of 0.953 g/cc and the part weight. The part shrinkage was calculated as 5.22%.

Example 11

97 wt % DOW DMDA-8904 was compounded with 3 wt % S POLYMER 33K according to the Compounding Method described above. The resulting formulation was injection molded according to the Injection Molding Method described above using a melt temperature of 210° C., a packing pressure of 400 bar and a pack time of 15 seconds. The part weight was measured to be 4.59 grams (g). The part volume was calculated to be 4.81 cc using a density of 0.953 g/cc and the part weight. The part shrinkage was calculated as 6.42%.

Example 12

97 wt % DOW DMDA-8904 was compounded with 3 wt % S POLYMER 33K according to the Compounding Method described above. The resulting formulation was injection molded according to the Injection Molding Method described above using a melt temperature of 210° C., a packing pressure of 400 bar and a pack time of 10 seconds. The part weight was measured to be 4.49 grams (g). The part volume was calculated to be 4.71 cc using a density of 0.953 g/cc and the part weight. The part shrinkage was calculated as 8.40%.

Example 13

97 wt % DOW DMDA-8904 was compounded with 3 wt % S POLYMER 33K according to the Compounding Method described above. The resulting formulation was injection molded according to the Injection Molding Method described above using a melt temperature of 210° C., a packing pressure of 800 bar and a pack time of 25 seconds. The part weight was measured to be 4.75 grams (g). The part volume was calculated to be 4.97 cc using a density of 0.953 g/cc and the part weight. The part shrinkage was calculated as 3.22%. Physical properties were tested according to ASTM D 790 Method B using a support span of 50.8 mm, a rate of specimen loading of 13.55 mm/min and recorded in Table IV.

Example 14

97 wt % DOW DMDA-8904 was compounded with 3 wt % S POLYMER 33K according to the Compounding Method described above. The resulting formulation was injection molded according to the Injection Molding Method described above using a melt temperature of 210° C., a packing pressure of 800 bar and a pack time of 20 seconds. The part weight was measured to be 4.74 grams (g). The part volume was calculated to be 4.97 cc using a density of 0.953 g/cc and the part weight. The part shrinkage was calculated as 3.22%.

Example 15

97 wt % DOW DMDA-8904 was compounded with 3 wt % S POLYMER 33K according to the Compounding Method described above. The resulting formulation was injection molded according to the Injection Molding Method described above using a melt temperature of 210° C., a packing pressure of 800 bar and a pack time of 15 seconds. The part weight was measured to be 4.67 grams (g). The part volume was calculated to be 4.90 cc using a density of 0.953 g/cc and the part weight. The part shrinkage was calculated as 4.69%.

Example 16

97 wt % DOW DMDA-8904 was compounded with 3 wt % S POLYMER 33K according to the Compounding Method described above. The resulting formulation was injection molded according to the Injection Molding Method described above using a melt temperature of 210° C., a packing pressure of 800 bar and a pack time of 10 seconds. The part weight was measured to be 4.56 grams (g). The part volume was calculated to be 4.78 cc using a density of 0.953 g/cc and the part weight. The part shrinkage was calculated as 7.09%.

TABLE I

| Examples | Part weight (g) | Part Volume (cc) | Part shrinkage (%) |
| --- | --- | --- | --- |
| CE1 | 4.60 | 4.83 | 6.27 |
| EX1 | 4.61 | 4.83 | 6.07 |
| CE2 | 4.60 | 4.83 | 6.27 |
| EX2 | 4.61 | 4.83 | 6.07 |
| CE3 | 4.58 | 4.81 | 6.58 |
| EX3 | 4.59 | 4.81 | 6.48 |
| CE4 | 4.52 | 4.75 | 7.81 |
| EX4 | 4.52 | 4.75 | 7.75 |
| CE5 | 4.66 | 4.89 | 5.01 |
| EX5 | 4.71 | 4.95 | 3.85 |
| CE6 | 4.66 | 4.90 | 4.91 |
| EX6 | 4.71 | 4.95 | 3.85 |
| CE7 | 4.65 | 4.88 | 5.24 |
| EX7 | 4.67 | 4.90 | 4.79 |
| CE8 | 4.58 | 4.81 | 6.65 |
| EX8 | 4.57 | 4.79 | 6.85 |
| EX9 | 4.66 | 4.89 | 4.91 |
| EX10 | 4.65 | 4.87 | 5.22 |
| EX11 | 4.59 | 4.81 | 6.42 |
| EX12 | 4.49 | 4.71 | 8.40 |
| EX13 | 4.75 | 4.97 | 3.22 |
| EX14 | 4.74 | 4.97 | 3.22 |
| EX15 | 4.67 | 4.90 | 4.69 |
| EX16 | 4.56 | 4.78 | 7.09 |

The data in Table I show that the lowest part shrinkage for parts made without S POLYMER 33K is obtained at conditions using the highest injection pressure and packing pressure while the addition of S POLYMER 33K to the thermoplastic component injection molded under the same conditions resulted in less shrinkage in the parts having S POLYMER 33K than parts injected molded without S POLYMER 33K. The data in Table I also shows the effects of packing pressure and packing pressure holding time on part weight, part volume and part shrinkage both with and without S POLYMER 33K. Table I also shows that higher weight percentages of S POLYMER 33K (i.e. 3 wt % versus 1 wt %) in the injection molded mixtures 3% by weight resulted in the ability to make parts at lower pack pressures while maintaining the same shrinkage percentage.

Example 17

99 wt % DOW DMDA-8904 was compounded with 1 wt % S POLYMER 14K according to the Compounding Method described above. The resulting formulation was injection molded according to the Injection Molding Method described above using a melt temperature of 210° C., a packing pressure of 400 bar and a pack time of 25 seconds. The part volume was calculated as 4.85 cc. The part shrinkage was calculated as 5.83%.

Example 18

99 wt % DOW DMDA-8904 was compounded with 1 wt % S POLYMER 14K according to the Compounding Method described above. The resulting formulation was injection molded according to the Injection Molding Method described above using a melt temperature of 210° C., a packing pressure of 800 bar and a pack time of 25 seconds. The part volume was calculated as 4.97 cc. The part shrinkage was calculated as 3.57%. Physical properties were tested according to ASTM D 790 Method B using a support span of 50.8 mm, a rate of specimen loading of 13.55 mm/min and recorded in Table IV.

Example 19

97 wt % DOW DMDA-8904 was compounded with 3 wt % S POLYMER 14K according to the Compounding Method described above. The resulting formulation was injection molded according to the Injection Molding Method described above using a melt temperature of 210° C., a packing pressure of 400 bar and a pack time of 25 seconds. The part volume was calculated as 4.89 cc. The part shrinkage was calculated as 4.97%.

Example 20

97 wt % DOW DMDA-8904 was compounded with 3 wt % S POLYMER 14K according to the Compounding Method described above. The resulting formulation was injection molded according to the Injection Molding Method described above using a melt temperature of 210° C., a packing pressure of 800 bar and a pack time of 25 seconds. The part volume was calculated as 4.98 cc. The part shrinkage was calculated as 3.32%.

Example 21

99 wt % DOW DMDA-8904 was compounded with 1 wt % SILICONE POLY UREA BLOCK POLYMER according to the Compounding Method described above. The resulting formulation was injection molded according to the Injection Molding Method described above using a melt temperature of 210° C., a packing pressure of 400 bar and a pack time of 25 seconds. The part volume was calculated as 4.85 cc. The part shrinkage was calculated as 5.83%.

Example 22

99 wt % DOW DMDA-8904 was compounded with 1 wt % SILICONE POLY

UREA BLOCK POLYMER according to the Compounding Method described above. The resulting formulation was injection molded according to the Injection Molding Method described above using a melt temperature of 210° C., a packing pressure of 800 bar and a pack time of 25 seconds. The part volume was calculated as 4.97 cc. The part shrinkage was calculated as 3.59%.

Example 23

97 wt % DOW DMDA-8904 was compounded with 3 wt % SILICONE POLY UREA BLOCK POLYMER according to the Compounding Method described above. The resulting formulation was injection molded according to the Injection Molding Method described above using a melt temperature of 210° C., a packing pressure of 400 bar and a pack time of 25 seconds. The part volume was calculated as 4.89 cc. The part shrinkage was calculated as 5.14%.

Example 24

97 wt % DOW DMDA-8904 was compounded with 3 wt % SILICONE POLY UREA BLOCK POLYMER according to the Compounding Method described above. The resulting formulation was injection molded according to the Injection Molding Method described above using a melt temperature of 210° C., a packing pressure of 800 bar and a pack time of 25 seconds. The part volume was calculated as 4.97 cc. The part shrinkage was calculated as 3.59%.

TABLE II

| Examples | Part Volume (cc) | Part Shrinkage |
| --- | --- | --- |
| CE1 | 4.83 | 6.27 |
| CE5 | 4.89 | 5.01 |
| EX1 | 4.83 | 6.07 |
| EX5 | 4.95 | 3.85 |
| EX9 | 4.89 | 4.91 |
| EX13 | 4.97 | 3.22 |
| EX17 | 4.85 | 5.83 |
| EX18 | 4.97 | 3.57 |
| EX19 | 4.89 | 4.97 |
| EX20 | 4.98 | 3.32 |
| EX21 | 4.85 | 5.83 |
| EX22 | 4.97 | 3.59 |
| EX23 | 4.89 | 5.14 |
| EX24 | 4.97 | 3.59 |

Comparative Example 9

100 wt % DOW IP 40 was injection molded according to the Injection Molding

Method described above using a melt temperature of 210° C., a packing pressure of 400 bar and a pack time of 25 seconds. The part volume was calculated to be 4.89 cc using a density of 0.952 g/cc and the part weight. The part shrinkage was calculated as 5.05%.

Comparative Example 10

100 wt % DOW IP 40 was injection molded according to the Injection Molding Method described above using a melt temperature of 210° C., a packing pressure of 800 bar and a pack time of 25 seconds. The part volume was calculated to be 4.95 cc using a density of 0.952 g/cc and the part weight. The part shrinkage was calculated as 3.88%.

Comparative Example 11

100 wt % EXXONMOBIL HD 6719.17 was injection molded according to the Injection Molding Method described above using a melt temperature of 210° C., a packing pressure of 400 bar and a pack time of 25 seconds. The part volume was calculated to be 4.86 cc using a density of 0.952 g/cc and the part weight. The part shrinkage was calculated as 6.21%.

Comparative Example 12

100 wt % EXXONMOBIL HD 6719.17 was injection molded according to the Injection Molding Method described above using a melt temperature of 210° C., a packing pressure of 800 bar and a pack time of 25 seconds. The part volume was calculated to be 4.93 cc using a density of 0.952 g/cc and the part weight. The part shrinkage was calculated as 4.27%.

Comparative Example 13

100 wt % EXXONMOBIL HD 6908 was injection molded according to the Injection Molding Method described above using a melt temperature of 210° C., a packing pressure of 400 bar and a pack time of 25 seconds. The part volume was calculated to be 4.83 cc using a density of 0.952 g/cc and the part weight. The part shrinkage was calculated as 6.21%.

Comparative Example 14

100 wt % EXXONMOBIL HD 6908 was injection molded according to the Injection Molding Method described above using a melt temperature of 210° C., a packing pressure of 800 bar and a pack time of 25 seconds. The part volume was calculated to be 4.91 cc using a density of 0.952 g/cc and the part weight. The part shrinkage was calculated as 4.66%.

TABLE III

| Examples | Part Volume | Part Shrinkage |
|----------|-------------|----------------|
| CE1      | 4.83        | 6.27           |
| CE5      | 4.89        | 5.01           |
| CE9      | 4.89        | 5.05           |
| CE10     | 4.95        | 3.88           |
| CE11     | 4.86        | 5.63           |
| CE12     | 4.93        | 4.27           |
| CE13     | 4.83        | 6.21           |
| CE14     | 4.91        | 4.66           |

The data in Table III shows that, as the molecular weight of the thermoplastic component increases, the ability to fill the mold is reduced and higher applied injection pressures are able to compensate for the lack of filling the mold.

TABLE IV

| Examples | Flexural Strength (Mpa) | Elastic Modulus (Mpa) |
|----------|-------------------------|------------------------|
| CE5      | 35.9 +/− 0.6            | 1226 +/− 36            |
| EX5      | 26.6 +/− 0.2            | 871.0 +/− 3            |
| EX13     | 25.9 +/− 0.1            | 846.0 +/− 6            |
| EX18     | 26.36 +/− 0.2           | 851.9 +/− 9.2          |

None of the Examples summarized in Table IV above failed by breaking

Comparative Example 15

100 wt % EXXONMOBIL CPP 1042 was injection molded according to the
Injection Molding Method described above using a melt temperature of 210° C., a packing pressure of 170 bar and a pack time of 45 seconds. The part volume was calculated to be 4.87 cc using a density of 0.9 g/cc and the part weight. The part shrinkage was calculated as 5.50%.

Comparative Example 16

100 wt % EXXONMOBIL CPP 1042 was injection molded according to the Injection Molding Method described above using a melt temperature of 210° C., a packing pressure of 340 bar and a pack time of 45 seconds. The part volume was calculated to be 4.93 cc using a density of 0.9 g/cc and the part weight. The part shrinkage was calculated as 4.21%.

Comparative Example 17

100 wt % EXXONMOBIL CPP 1042 was injection molded according to the Injection Molding Method described above using a melt temperature of 210° C., a packing pressure of 510 bar and a pack time of 45 seconds. The part volume was calculated to be 4.98 cc using a density of 0.9 g/cc and the part weight. The part shrinkage was calculated as 3.34%.

Comparative Example 18

99 wt % EXXONMOBIL CPP 1042 was compounded with 1 wt % S POLYMER 33K according to the Compounding Method described above. The resulting formulation was injection molded according to the Injection Molding Method described above using a melt temperature of 210° C., a packing pressure of 170 bar and a pack time of 45 seconds. The part volume was calculated to be 4.86 cc. The part shrinkage was calculated as 5.61%.

Comparative Example 19

99 wt % EXXONMOBIL CPP 1042 was compounded with 1 wt % S POLYMER 33K according to the Compounding Method described above. The resulting formulation was injection molded according to the Injection Molding Method described above using a melt temperature of 210° C., a packing pressure of 340 bar and a pack time of 45 seconds. The part volume was calculated to be 4.94 cc. The part shrinkage was calculated as 4.10%.

Comparative Example 20

99 wt % EXXONMOBIL CPP 1042 was compounded with 1 wt % S POLYMER 33K according to the Compounding Method described above. The resulting formulation was injection molded according to the Injection Molding Method described above using a melt temperature of 210° C., a packing pressure of 510 bar and a pack time of 45 seconds. The part volume was calculated to be 4.97 cc. The part shrinkage was calculated as 3.45%.

Comparative Example 21

97 wt % EXXONMOBIL CPP 1042 was compounded with 3 wt % S POLYMER 33K according to the Compounding Method described above. The resulting formulation was injection molded according to the Injection Molding Method described above using a melt temperature of 210° C., a packing pressure of 170 bar and a pack time of 45 seconds. The part volume was calculated to be 4.86 cc. The part shrinkage was calculated as 5.60%.

Comparative Example 22

97 wt % EXXONMOBIL CPP 1042 was compounded with 3 wt % S POLYMER 33K according to the Compounding Method described above. The resulting formulation was injection molded according to the Injection Molding Method described above using a melt temperature of 210° C., a packing pressure of 340 bar and a pack time of 45 seconds. The part volume was calculated to be 4.96 cc. The part shrinkage was calculated as 3.67%.

Comparative Example 23

97 wt % EXXONMOBIL CPP 1042 was compounded with 3 wt % S POLYMER 33K according to the Compounding Method described above. The resulting formulation was injection molded according to the Injection Molding Method described above using a melt temperature of 210° C., a packing pressure of 510 bar and a pack time of 45 seconds. The part volume was calculated to be 4.99 cc. The part shrinkage was calculated as 3.02%.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. An injection molded article comprising a thermoplastic component and a thermoplastic silicon-based polymer process additive component, wherein the weight percent of thermoplastic silicone-based polymer process additive component based on the total weight of the article ranges from 0.1 wt % to 1.0 wt %, and further wherein the thermoplastic silicon based polymer process additive component is selected from:
   (a) at least one copolymer comprising at least two repeat units of Formula I-a:

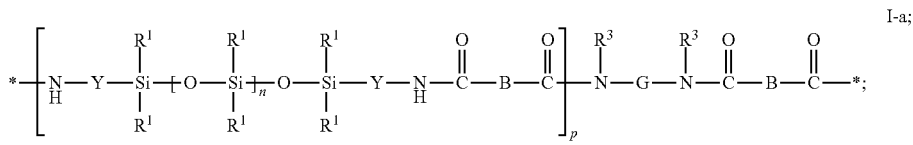

(b) at least one copolymer comprising at least two repeat units of Formula I-b:

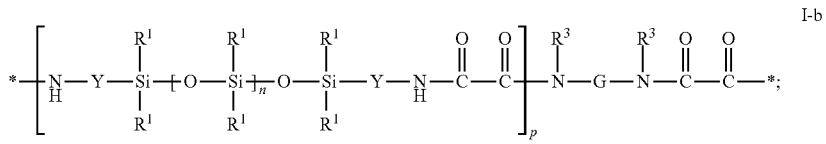

(c) at least one copolymer comprising at least two repeat units of Formula II:

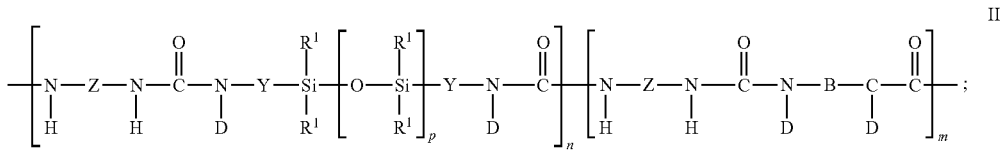

(d) and combinations thereof,
   wherein for Formulas I-a and I-b each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is a divalent residue; each group B is selected from a covalent bond, an alkylene of 4-20 carbons, an aralkylene, an arylene, or a combination thereof; n is an integer of 0 to 1500; and p is an integer of 1 to 10,
   and further wherein for Formula II each R is an alkyl moiety having about 1 to 12 carbon atoms; each Y is a polyvalent radical; each D is selected from hydrogen, an alkyl radical of 1 to 10 carbon atoms, phenyl, and a radical that completes a ring structure including B or Y to form a heterocyclic; B is a polyvalent radical selected from alkylene, aralkylene, cycloalkylene, phenylene, polyalkylene oxide, and mixtures thereof; Z is a polyvalent radical selected from arylene, aralkylene, alkylene, cycloalkylene, and mixtures thereof; m is an integer from 0 to 1000; n is greater than or equal to 1; and p is greater than or equal to 5.

2. The article of claim 1 wherein the divalent residue is derived from a diamine having the formula R3HN-G-NHR3, wherein R3 is selected from a hydrogen and an alkyl.

3. The article of claim 1 wherein the divalent residue is derived from a diamine having the formula R3HN-G-NHR3, wherein the diamine is a heterocyclic group.

4. The article of claim 1 wherein with regard to Formula II Y is independently an alkylene radical having 1 to 10 carbon atoms, an aralkylene radical having 6 to 20 carbon atoms, or an arylene radical having 6 to 20 carbon atoms.

5. The article of claim 1 wherein with regard to Formula II p is integer ranging from 15 to 2000.

6. The article of claim 1 wherein with regard to Formula II p is integer ranging from 30 to 1500.

7. The article of claim 1 wherein the refractive index of the thermoplastic silicone-based polymer process additive component ranges from about 1.407 to about 1.500.

8. The article of claim 1 wherein the thermoplastic silicone-based polymer process additive component has a molecular weight greater than 50,000 g/mole.

9. The article of claim 1 wherein the thermoplastic component is selected from polypropylenes, polystyrenes, polyethylenes, polyesters, fluoroplastics, and combinations thereof.

10. The article of claim 1 wherein the thermoplastic component is selected from polypropylenes, polyethylenes, and combinations thereof 11. The article of claim 1 wherein the article is a tube, bottle or tube fitting.

12. A method of making the article of claim 1 comprising:
   a) melt mixing the thermoplastic component and the silicone-based polymer process additive component to form a mixture; and
   b) injection molding the mixture.

13. The method of claim 12 wherein the melt mixing method step is done by batch blending or extrusion.

* * * * *

UNITED STATES PATENT AND TRADEMARK OFFICE
CERTIFICATE OF CORRECTION

PATENT NO.      : 8,552,136 B2                              Page 1 of 1
APPLICATION NO. : 13/131335
DATED           : October 8, 2013
INVENTOR(S)     : Papp et al.

It is certified that error appears in the above-identified patent and that said Letters Patent is hereby corrected as shown below:

In the Specification

Column 3
Line 2, Delete "R1" and insert -- $R^1$ --, therefor.

Column 5
Line 24, Delete "the the" and insert -- the --, therefor.

Column 7
Line 21, Delete "hey" and insert -- they --, therefor.

Column 9
Line 10, Delete "thereof" and insert -- thereof. --, therefor.

Column 13
Line 56, Delete "polyoxypropylene" and insert -- polyoxypropylene --, therefor.

Column 22
Line 21, Delete "thereof" and insert -- thereof. --, therefor.

Signed and Sealed this
Second Day of September, 2014

Michelle K. Lee
*Deputy Director of the United States Patent and Trademark Office*